(12) United States Patent
Maeta et al.

(10) Patent No.: US 6,588,834 B2
(45) Date of Patent: Jul. 8, 2003

(54) SLIDING ROOF DEVICE

(75) Inventors: Kenji Maeta, Kariya (JP); Masaji Ishikawa, Toyoake (JP); Akira Matsuura, Toyota (JP); Reiki Kawamura, Toyota (JP); Yasuo Oyama, Nagoya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/989,190

(22) Filed: Nov. 21, 2001

(65) Prior Publication Data

US 2002/0060478 A1 May 23, 2002

(30) Foreign Application Priority Data

Nov. 21, 2000 (JP) ......................................... 2000-354962

(51) Int. Cl.[7] ................................................. B60J 7/053
(52) U.S. Cl. .................................. 296/216.04; 296/223
(58) Field of Search ........................... 296/223, 216.04; 74/502.5

(56) References Cited

U.S. PATENT DOCUMENTS

| 3,163,054 A | * | 12/1964 | Werner ................... 296/223 X |
| 5,020,850 A | * | 6/1991 | Bienert et al. .............. 296/223 |
| 5,026,113 A | * | 6/1991 | DiCarlo et al. ............. 296/221 |
| 5,104,178 A | * | 4/1992 | Bienert ................... 296/223 X |
| 5,147,107 A | * | 9/1992 | Yamauchi et al. ...... 296/223 X |
| 5,315,892 A | * | 5/1994 | Gabas et al. ........... 74/502.5 X |
| 6,431,644 B1 | * | 8/2002 | Nagashima et al. ........ 296/223 |

FOREIGN PATENT DOCUMENTS

| DE | 2937121 | * | 4/1981 | ................. 296/223 |
| DE | 3444947 | * | 6/1986 | ................. 296/223 |
| JP | 4-31358 | | 2/1992 | |
| JP | 7-69069 | | 3/1995 | |

* cited by examiner

*Primary Examiner*—Dennis H. Pedder
(74) *Attorney, Agent, or Firm*—Finnegan, Henderson, Farabow, Garrett & Dunner, L.L.P.

(57) ABSTRACT

A sliding roof device includes a housing disposed along at least front edge of an opening formed on a roof of a vehicle, a casing disposed along the housing, a driving force transmitting member slidably mounted and guided in the housing and driven by a driving mechanism and a sliding panel connected to the driving force transmitting member and being movable so as to open and close the opening by the sliding movement of the driving force transmitting member, wherein the casing is formed by a flexible raw material and a plural engaging portions which are displaced at least one of upper and lower and front and rear are formed on the housing, and wherein the casing is securely engaged with the engaging portions so as to be arranged zigzag.

5 Claims, 9 Drawing Sheets

SLIDING ROOF DEVICE

CROSS REFERENCE TO RELATED APPLICATION

This application is based on and claims priority under 35 U.S.A. §119 with respect to a Japanese Patent Application 2000-354962 filed on Nov. 21, 2000, the entire content of which is Incorporated herein by reference.

FIELD OF THE INVENTION

This invention relates to a sliding roof device and more particularly to a sliding roof device mounted on a roof of a vehicle.

BACKGROUND OF THE INVENTION

As one of the conventional sliding roof device of this kind, a sliding roof device is disclosed in Japanese patent laid-open publication No. 7-69069. This device includes a housing disposed along at least front edge of an opening formed on a roof of a vehicle, a casing disposed along the housing, a driving force transmitting member slidably mounted and guided in the housing and driven by a driving mechanism and a sliding panel connected to the driving force transmitting member and being movable so as to open and close the opening by the sliding movement of the driving force transmitting member.

According to such conventional device, a pipe which is in floating condition at least at center portion is adopted as the casing and a cogged cable (for example, see Japanese utility-model laid-open publication 4-31358) is adopted as the driving force transmitting member. Therefore, the pipe vibrates large at the center portion and Is apt to rattle. Further, prior cogged cable has a spiral tooth portion and a helical gear which gears with the spiral gear and a motor for driving the helical gear are adopted as the driving mechanism. However, since a transmissibility of the helical gear is lower than that of a spur gear, high output torque is required for the motor and therefore the size of the motor is increased.

SUMMARY OF THE INVENTION

Accordingly, it is an object of the present invention to provide an improved sliding roof device which overcomes the above drawback.

According to the present invention, a sliding roof device includes a housing disposed along at least front edge of an opening formed on a roof of a vehicle, a casing disposed along the housing, a driving force transmitting member slidably mounted and guided in the housing and driven by a driving mechanism and a sliding panel connected to the driving force transmitting member and being movable so as to open and close the opening by the sliding movement of the driving force transmitting member, wherein the casing is formed by a flexible raw material and a plural engaging portions which are displaced at least one of upper and lower and front and rear are formed on the housing, and wherein the casing is securely engaged with the engaging portions so as to be arranged zigzag.

According to the above structure of the invention, since the casing is formed by the flexible raw material and can easily deform and curve, it is able to securely engage the casing with the plural engaging portions which are displaced at least one of upper and lower and front and rear and which is formed on the housing. Further, since the casing which is mounted on the housing is arranged zigzag or meandering and is surely held by its elastic restoring force, it is able to prevent the casing from rattling.

BRIEF DESCRIPTION OF THE DRAWINGS

The foregoing and additional features and characteristics of the present invention will become more apparent from the following detailed description considered with reference to the accompanying drawing figures in which like reference numerals designate like elements and wherein.

DESCRIPTION OF THE EMBODIMENTS

Figure 1:
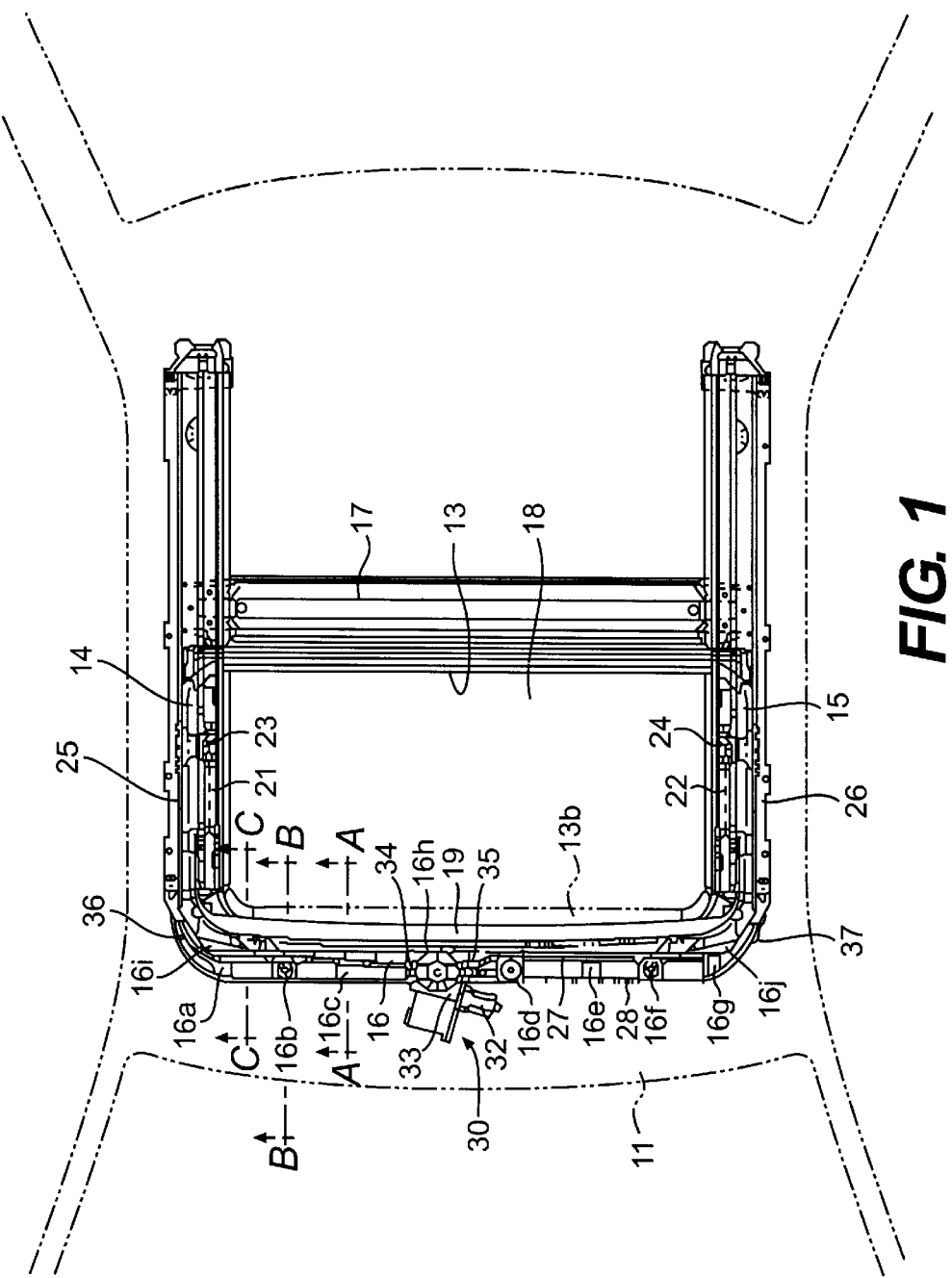
FIG. 1 is a plan view of an embodiment of a present invention.
Figure 2:
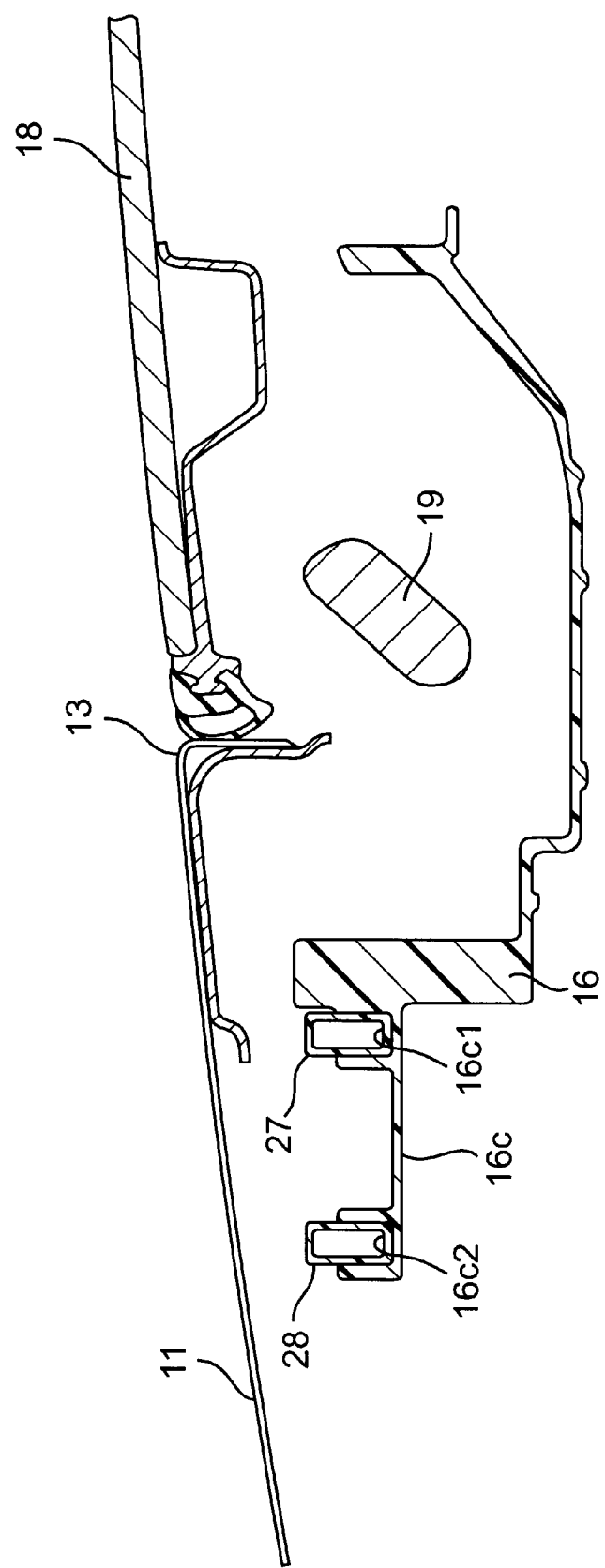
FIG. 2 shows a cross-sectional view taken on line A—A of FIG. 1.
Figure 3:
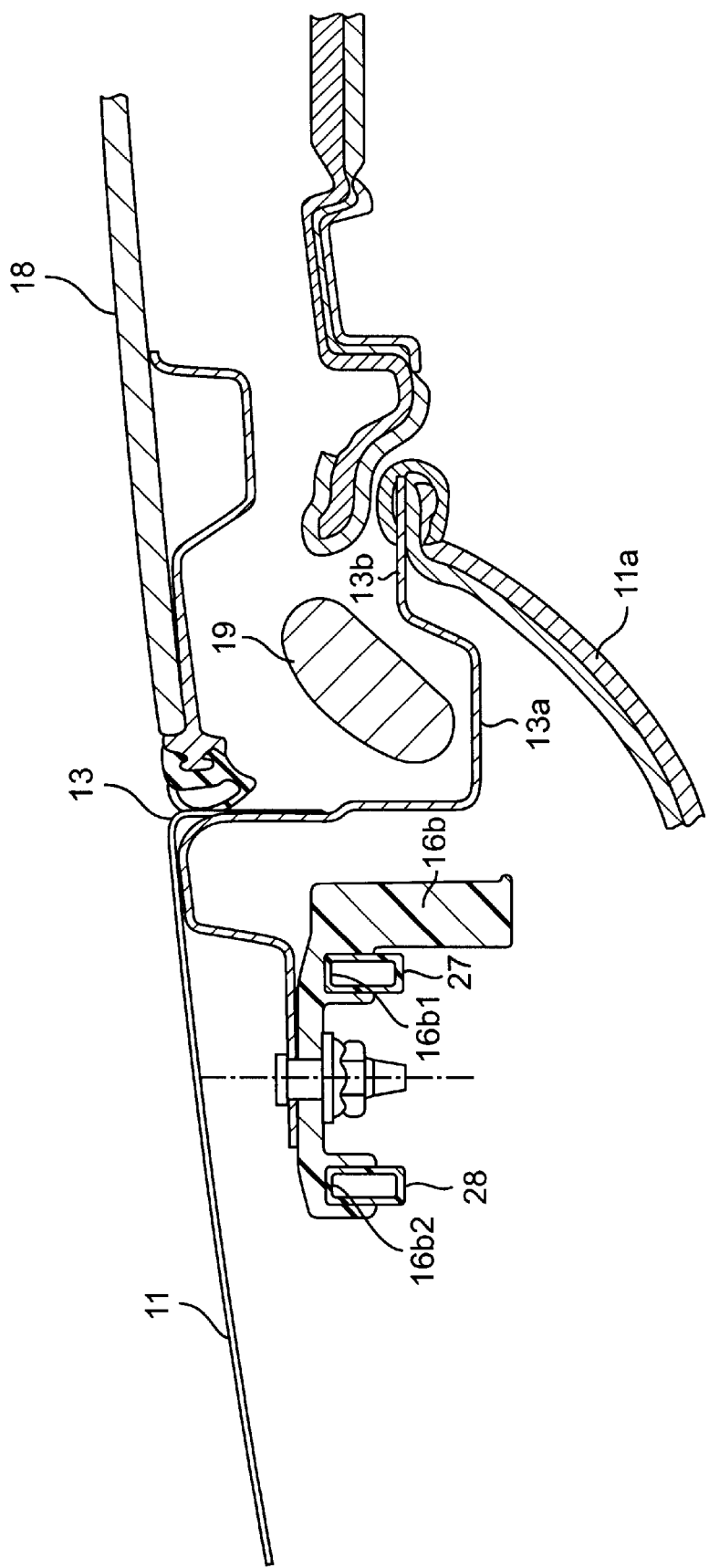
FIG. 3 shows a cross-sectional view taken on line B—B of FIG. 1.
Figure 4:
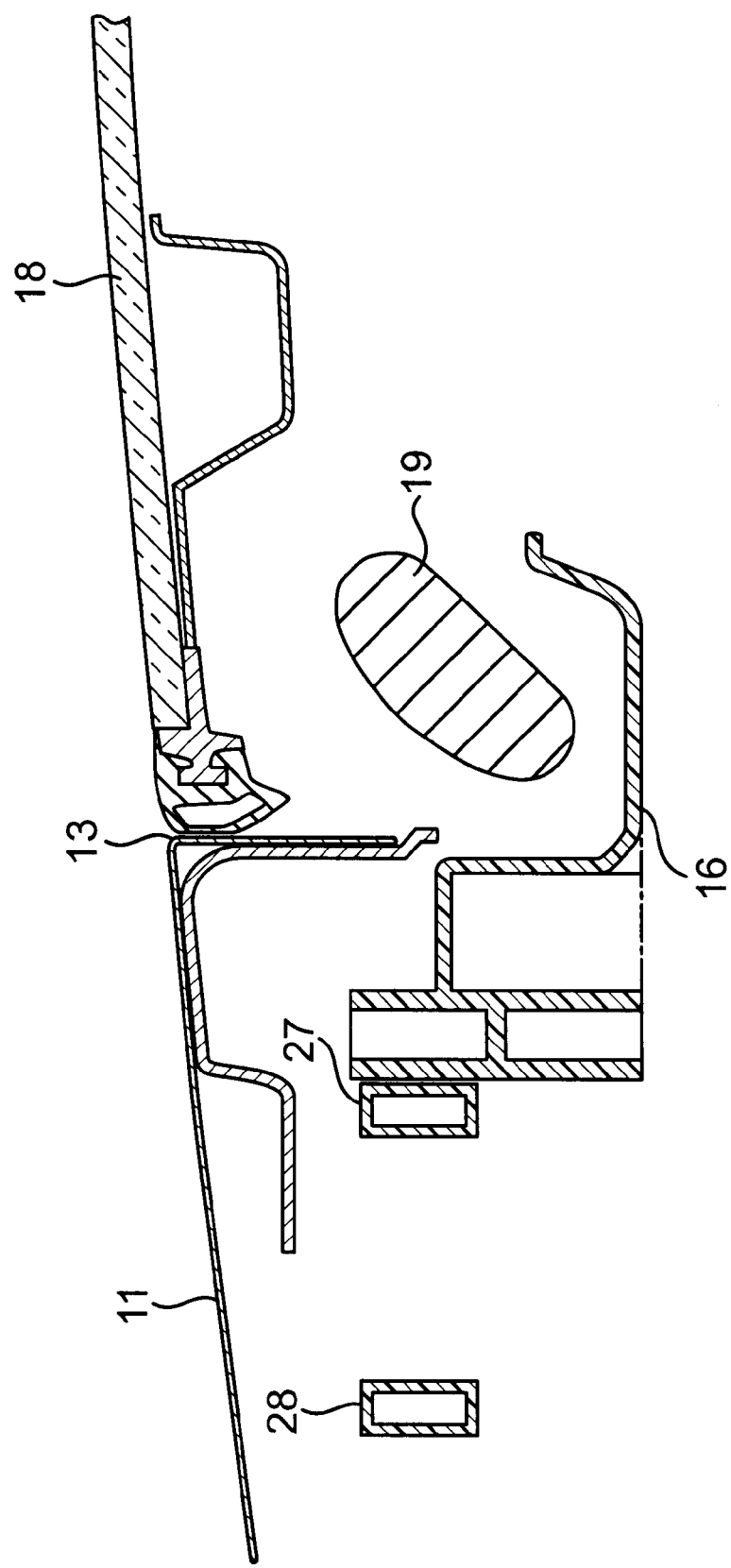
FIG. 4 shows a cross-sectional view taken on line C—C of FIG. 1.
Figure 5:
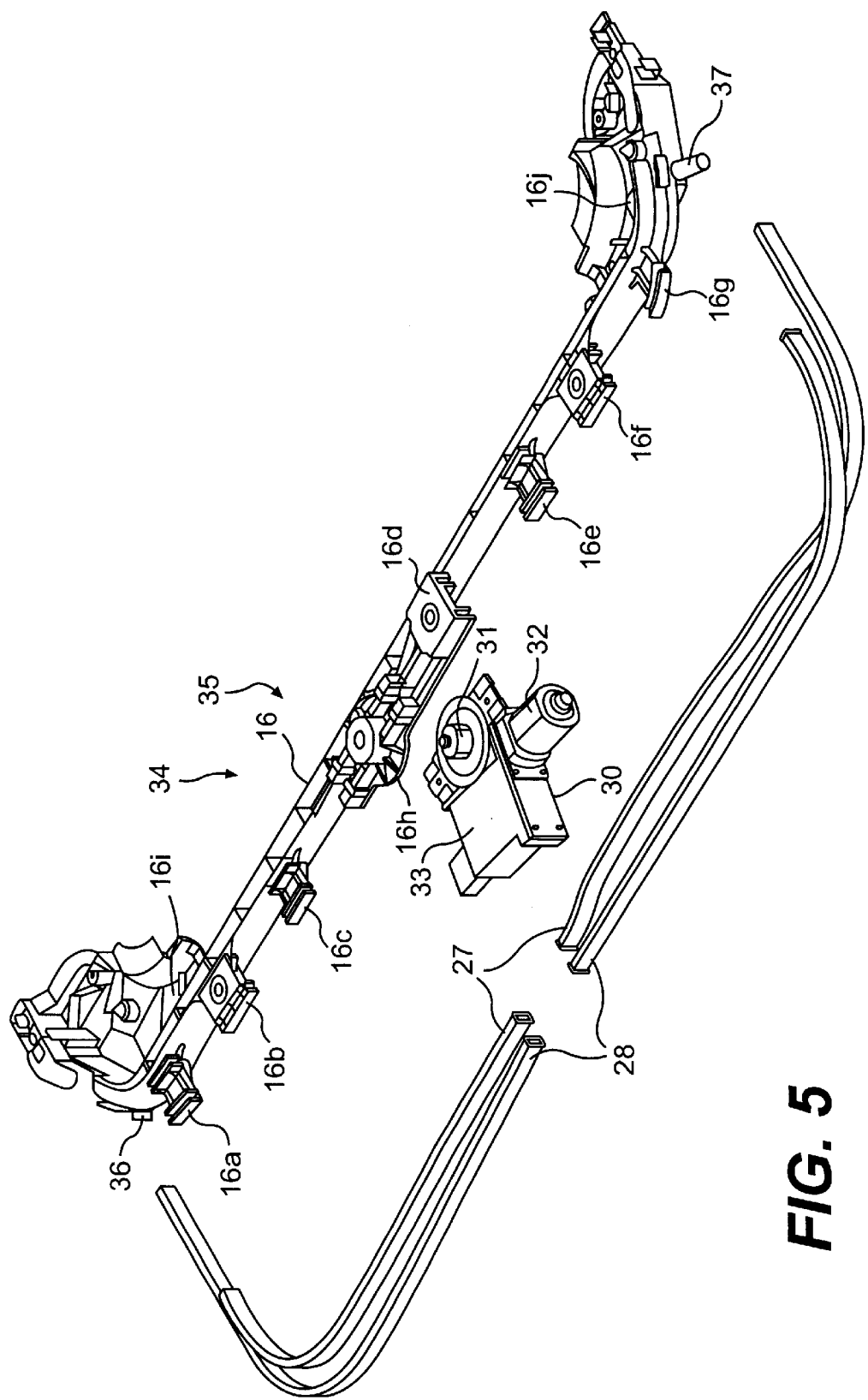
FIG. 5 is a perspective view of structures of front side of a sliding roof device shown in FIG. 1.
Figure 6:
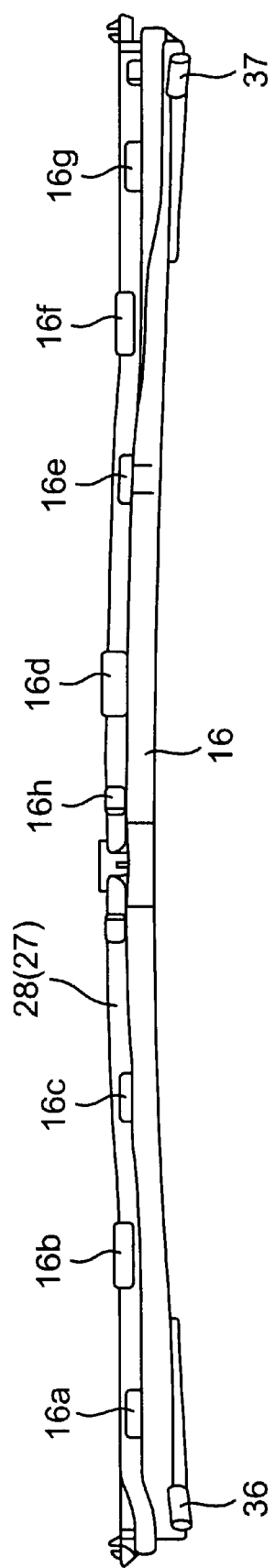
FIG. 6 is a front view showing a condition in which a casing is mounted on a housing.

Having generally described the present invention, a further understanding of the invention can be obtained now according to an embodiment of the present invention with reference to FIGS. 1 through 9 In accompanying drawings.

FIG. 1 to FIG. 9 show an embodiment of a sliding roof device in accordance with the present invention. A pair of guide rails 14, 15 are disposed so as to extend forward and rearward of a vehicle along right and left side edge of an opening 13 formed on a roof panel 11 shown by a virtual line in FIG. 1. A housing 16 Is disposed so as to extend right and left direction of the vehicle along a front edge of the opening 13. The guide rails 14, 15 and the housing 16 are fixed to a lower surface of the roof panel 11.

The guide rails 14, 15 are connected each other at its rear portion located rear side with respect to a rear edge of the opening portion 13 through a support 17. The support 17 is fixed to the lower surface of the roof panel 11. Link members 21, 22 which supports a slide panel 18 from lower side are mounted on the guide rails 14, 15 so as to be able to slide forward and rearward of the vehicle at their front ends and so as to be able to swing upward and downward at their front ends. Shoe members 23, 24 which make the link members 21, 22 slide forward and rearward and which make the link members 21, 22 swing upward and downward are mounted on the guide rails 14, 15 so as to be able to slide forward and rearward. Rear end portions of the spur gear rack belt 25, 26 which make the shoe members 23, 24 slide forward and rearward are mounted on the guide rails 14, 15 so as to be able to slide forward and rearward.

Figure 7:
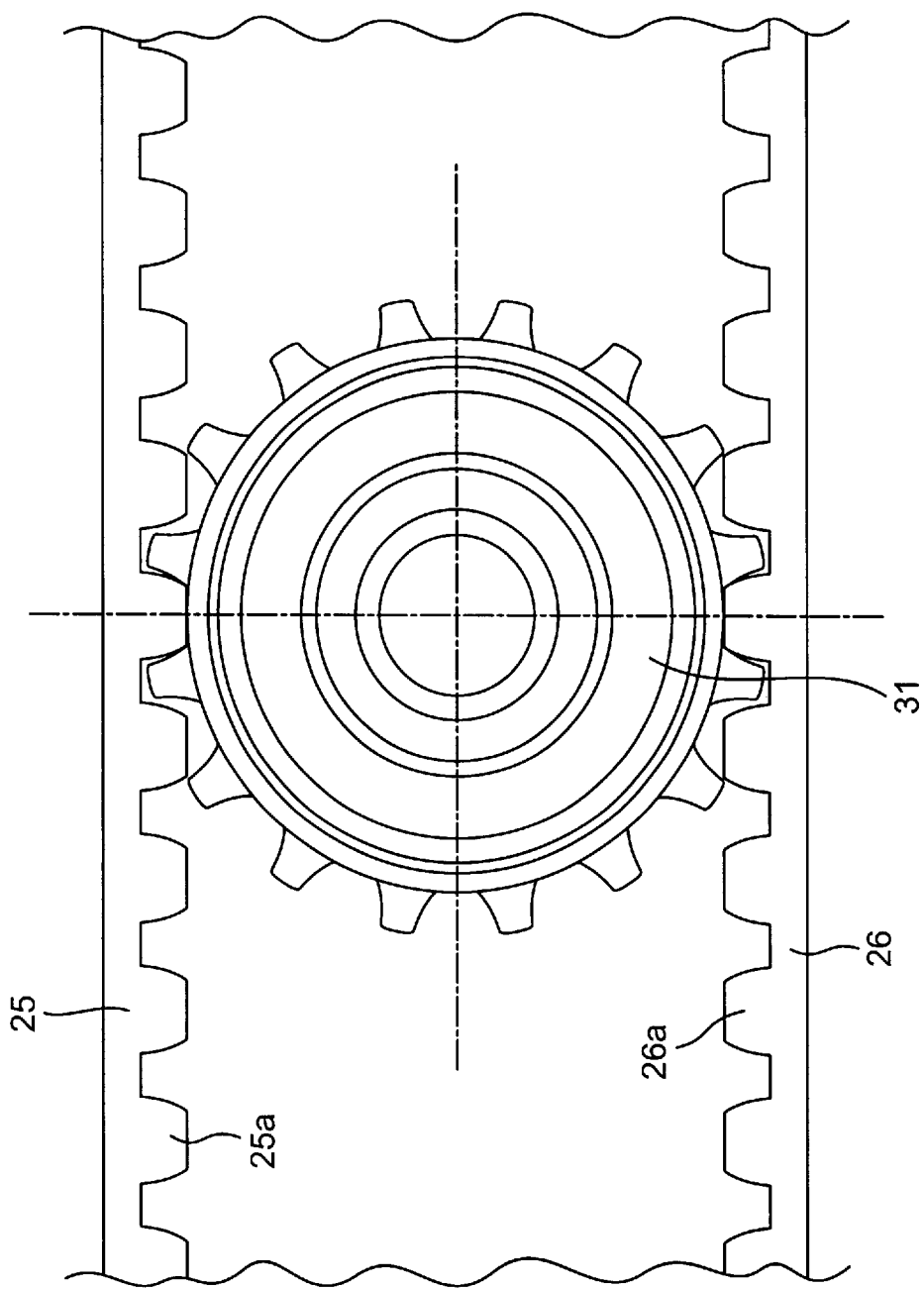
FIG. 7 is a plan view showing a relationship between a spur gear and a both spur gear rack belt.
Figure 8:
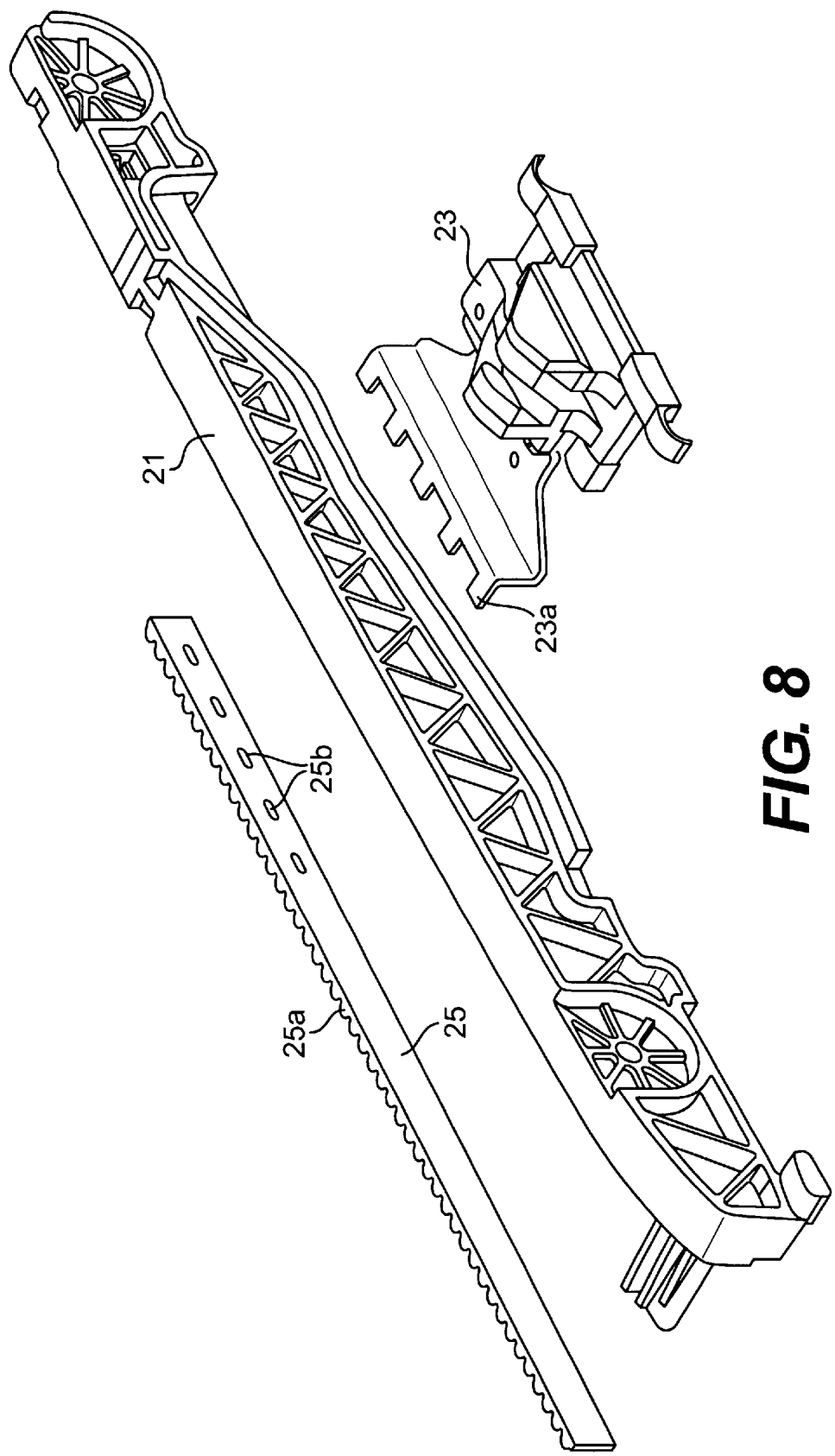
FIG. 8 is a perspective view showing a link member, a shoe member and area end of a spur gear rack belt.
Figure 9:
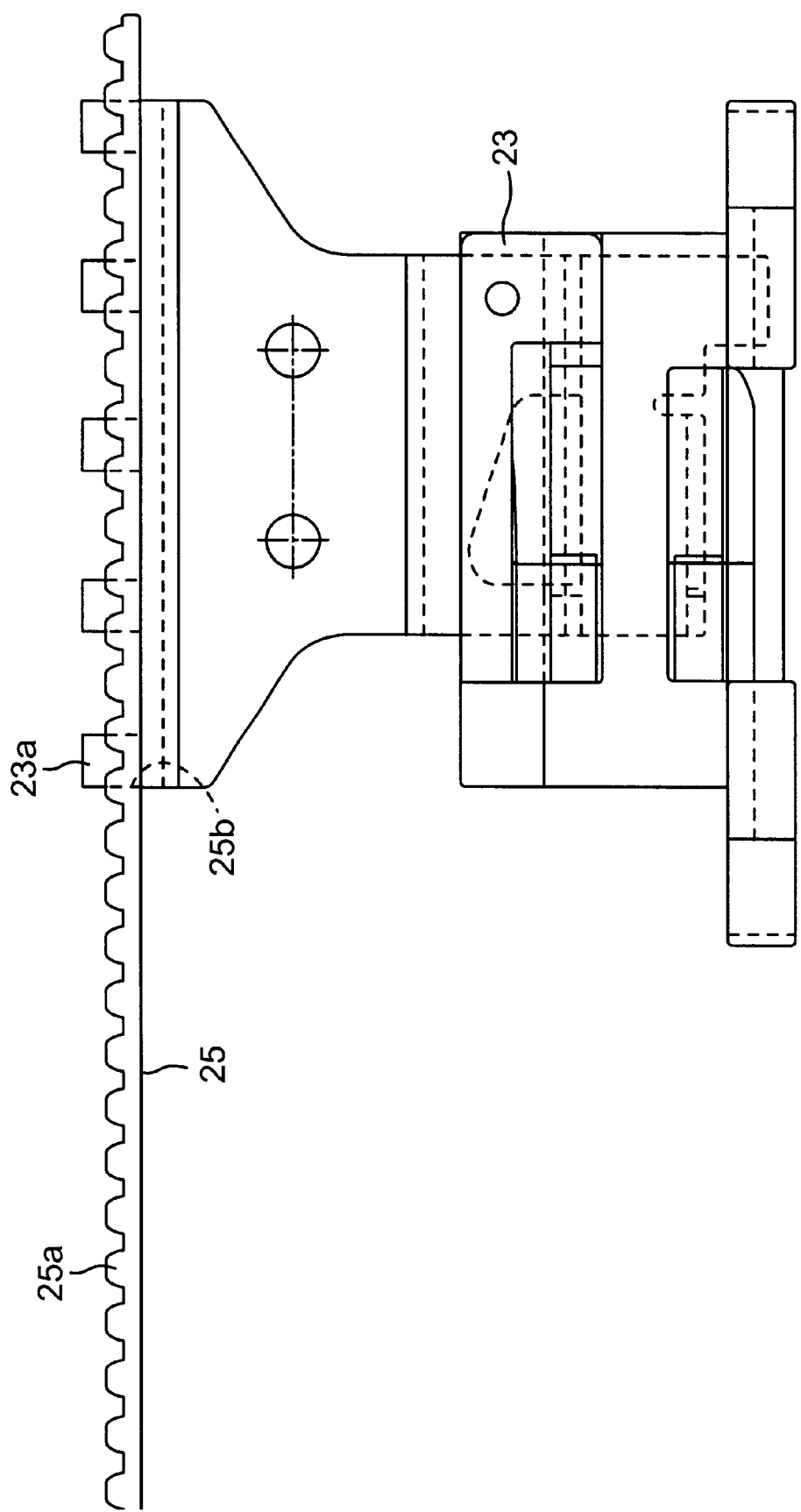
FIG. 9 is a plan view showing a connecting relationship between the shoe member and the spur gear rack belt.

The housing 16 is connected to front ends of the guide rails 14, 15 at right and left both ends and supports the casings 27, 28 which guide and accommodate the spur gear rack belt 25, 26 so as to be able to slide. The housing 16 supports also a driving mechanism 30 for driving the spur gear rack belt 25, 26. The driving mechanism 30 Includes a spur gear 31 which gears with each spur gears 25a, 26a of the spur gear rack belts 25, 26 as shown in FIG. 7, a motor 32 for driving the spur gear 31 and a gear housing 33 which supports the spur gear 31 and the motor 32. Thereby, when the motor 32 drives the spur gear 31 obverse or reverse direction, the spur gear rack belt 25, 26 are driven in the reverse direction.

Thereby, when the motor 32 drives the spur gear 31 obverse or reverse direction, the link members 21, 22 and the shoe members 23, 24 are driven and a sliding panel 18 moves so as to open and close the opening 13 formed on the roof panel 11. Accompanying the drive of the link members 21, 22 and the shoe members 23, 24, a deflector 19 which is connected to the front end of the guide rails 14, 15 so as to be able to swing at right and left and and which is always urged upward by a spring (not shown) swings. Thereby, the deflector 19 projects upward from the roof panel 11 when the opening portion 13 is opened and the deflector 19 is accommodated downward from the roof panel 11 when the opening portion 13 is closed.

In this embodiment, the casings 27, 28 disposed along the housing 16 is formed by a flexible raw material such as resin and so on and have a rectangular cross section. A plural engaging portions 16a–16g which are displaced upper and lower and front and rear (alternately arranged) are formed on the housing 16. The casings 27, 28 are securely engaged with engaging grooves (see engaging grooves 16c1, 16c2 in FIG. 2 and engaging grooves 16b1, 16b2 in FIG. 3) formed on the engaging portions 16a–16g so as to be arranged zigzag. Thereby, the casings 27, 28 can easily deform and curve and it is able to securely engage the casings 27, 28 with the plural engaging portions 16a–16g.

Further, since the casings 27, 28 which are mounted on the housing 16 is arranged zigzag or meandering and are surely held by their elastic restoring force, it is able to prevent the casings 27, 28 from rattling. Further, since resin can be adopted as a raw material for the casings 27, 28, it is able to decrease the weight of the sliding roof device.

In this embodiment, the spur gear rack belt 25, 26 made of resin is adopted as the driving force transmitting member for transmitting the driving force of the driving mechanism 30 to the shoe member 23, 24. Further, the driving mechanism 30 includes the spur gear 31 geared with the tooth portion 25a, 26a of the spur gear rack belts 25, 26 and the motor 32 for driving the spur gear 31. Thereby, the rotation of the motor 32 can be transmitted efficiently from the spur gear 31 to the spur gear rack belts 25, 26. Accordingly, it is able to miniaturize the size of the motor 32 and to decrease the weight of the motor 32.

Further, in this embodiment, the shoe members 23, 24 which move with the sliding panel 18 forward and rearward and the rear end portions 25, 26 of the spur gear rack belts 25, 26 are slidably mounted on the guide rails 14, 15, respectively. Five engaging nail portions (see engaging nail portion 23a in FIG. 8 and FIG. 9) which are formed on the shoe members 23, 24 so as to extend laterally are fitted into five engaging holes (see engaging hole 25b in FIG. 8 and FIG. 9) which are formed on the rear end portions of the spur gear rack belts 25, 26 so as to penetrate right and left direction and thereby the shoe members 23, 24 are connected to the spur gear rack belts 25, 26.

Thereby, it is able to easily and surely connect between the shoe members 23, 24 and the spur gear rack belts 25, 26. Further, since the engaging nail portions (23a) of the shoe members 23, 24 and the engaging holes (25b) of the spur gear rack belts 25, 26 can be formed by simple processing or forming, the manufacturing cost of the device can be decreased.

Further, a cover 16h which surround the upper of the spur gear 31 is formed on the housing 16 in one body. A gear housing 33 is fixed to the cover 16h by two bolts 34, 35. When the gear housing 33 is fixed to the cover 16h, the central connecting portions of the casings 27, 28 (the casing is divided at the gear housing 33 at a center) is nipped and supported. Therefore, the number of the parts is decreased and manufacturing cost is further decreased.

Further, in this embodiment, a tub portion 13a In the front side of the opening portion 13 is formed at the side of the roof panel 11. Water which drops into the tub portion 13a is introduced into tub portions 16i, 16j formed on right an left end portions of the housing 16 and then is discharged through drain pipes 36, 37 mounted on the housing 16. Further, a flange portion 13b which extend horizontally toward the opening is formed at the tub portion 13a and is fixed to lower roof 11a. Thereby, the strength required for the housing 16 can be set lower and the housing 16 can be miniaturized. Therefore, the manufacturing cost of the housing 18 can be decreased.

Having now fully described the invention. It will be apparent to one of the ordinary skill in the art that many changes and modifications can be made without departing from the spirit or scope of the invention as set forth herein.

What is claimed is:

1. A sliding roof device comprising:

a housing disposed along at least front edge of an opening on a roof of a vehicle, a casing disposed along the housing, a driving force transmitting member slidably mounted and guided in the housing and driven by a driving mechanism and a sliding panel connected to the driving force transmitting member and being movable so as to open and close the opening by the sliding movement of the driving force transmitting member, wherein the casing is formed by a flexible material, and a plurality of engaging portions which are alternately disposed at upper and lower positions are formed on the housing, and wherein the casing is deformed and securely engaged with the engaging portions to define a generally wavy path with respect to a plane.

2. A sliding roof device according to claim 1, wherein the driving force transmitting member is a resin spur gear rack belt.

3. A sliding roof device according to claim 2, wherein a shoe member which moves with the sliding panel forward and rearward and the end portion of the spur gear rack belt are slidably mounted on a guide rail disposed forward and rearward along the side edge of the opening portion, respectively, and wherein an engaging nail portion which is formed on the shoe member is fitted into an engaging hole which is formed on the end portion of the spur gear rack belt so that the shoe member is connected to the spur gear rack belt.

4. A sliding roof device comprising:

a housing disposed along at least a front edge of an opening on a roof of a vehicle, a casing disposed along the housing, a driving force transmitting member slidably mounted and guided in the housing and driven by a driving mechanism and a sliding panel connected to the driving force transmitting member and being movable so as to open and close the opening by the sliding movement of the driving force transmitting member, wherein the casing is formed by a flexible material, and a plurality of engaging portions which are alternately disposed at upper and lower positions are formed on the housing, and wherein the casing is deformed and engaged with the engaging portions to define a generally wavy path with respect to a plane; and wherein the driving force transmitting member is a spur gear rack belt.

5. A sliding root device comprising:

a housing disposed along at least front edge of an opening on a roof of a vehicle, a casing disposed along the housing, a driving force transmitting member comprising a spur gear rack belt slidably mounted and guided in the housing and driven by a driving mechanism and a sliding panel connected to the driving force transmitting member and being movable so as to open and close the opening by the sliding movement of the driving force transmitting member, wherein the casing is formed by a flexible material, and a plurality of engaging portions which are alternately disposed at upper and lower positions are formed on the housing, and wherein the casing is deformed and engaged with the engaging portions to define a generally wavy path with respect to a plane; and wherein a shoe member which moves with the sliding panel forward and rearward and the end portion of the spur gear rack belt are slidably mounted on a guide rail disposed forward and rearward along the side edge of the opening portion, respectively, and wherein an engaging nail portion, which is formed on the shoe member is fined into an engaging hole which is formed on the end portion of the spur gear rack belt so that the shoe member is connected to the spur gear rack belt.

* * * * *

UNITED STATES PATENT AND TRADEMARK OFFICE
CERTIFICATE OF CORRECTION

PATENT NO.   : 6,588,834 B2
DATED        : July 8, 2003
INVENTOR(S)  : Kenji Maeta It is certified that error appears in the above-identified patent and that said Letters Patent is hereby corrected as shown below:

Column 6,
Line 16, "fined" should read -- fitted --.

Signed and Sealed this

Twenty-third Day of September, 2003

JAMES E. ROGAN
*Director of the United States Patent and Trademark Office*